United States Patent [19]
Wiemer et al.

[11] 3,925,038
[45] Dec. 9, 1975

[54] WATER DEGASSING DEVICE

[75] Inventors: Willem Wiemer, Delden; Mattheus Besier, Hengelo, both of Netherlands

[73] Assignee: B. V. Koninklijke Machinefabriek, Hengelo, Netherlands

[22] Filed: Mar. 6, 1973

[21] Appl. No.: 338,645

[30] Foreign Application Priority Data
Mar. 14, 1972 Netherlands .................... 7203333

[52] U.S. Cl. .................. 55/159; 55/176; 55/183; 210/198; 210/221
[51] Int. Cl.² ........................................ B01D 19/00
[58] Field of Search ....... 55/36, 159, 176, 183, 190, 55/194, 192, 201, 257, 259, 39, 186, 193; 210/198, 221

[56] References Cited
UNITED STATES PATENTS
457,917  8/1891  Shaw.................... 55/194 X
2,452,716  11/1948  Bergquist................ 55/201 X Primary Examiner—Charles N. Hart
Assistant Examiner—Ferris H. Lander
Attorney, Agent, or Firm—Snyder, Brown and Ramik

[57] ABSTRACT

A device for degassing water under excess pressure comprising a vessel with at least one nozzle spraying, in operation, water in the form of a screen projecting above the water level in the vessel, wherein in the path of the water screen the nozzle is surrounded by surfaces breaking up the jets and forming part of a splash grating formed by a plurality of strips arranged on end and overlapping each other in a direction of height and being relatively off-set in the direction of flow of the water from the nozzle, a higher strip being located, viewed in the direction of outflow, behind a lower strip.

7 Claims, 8 Drawing Figures

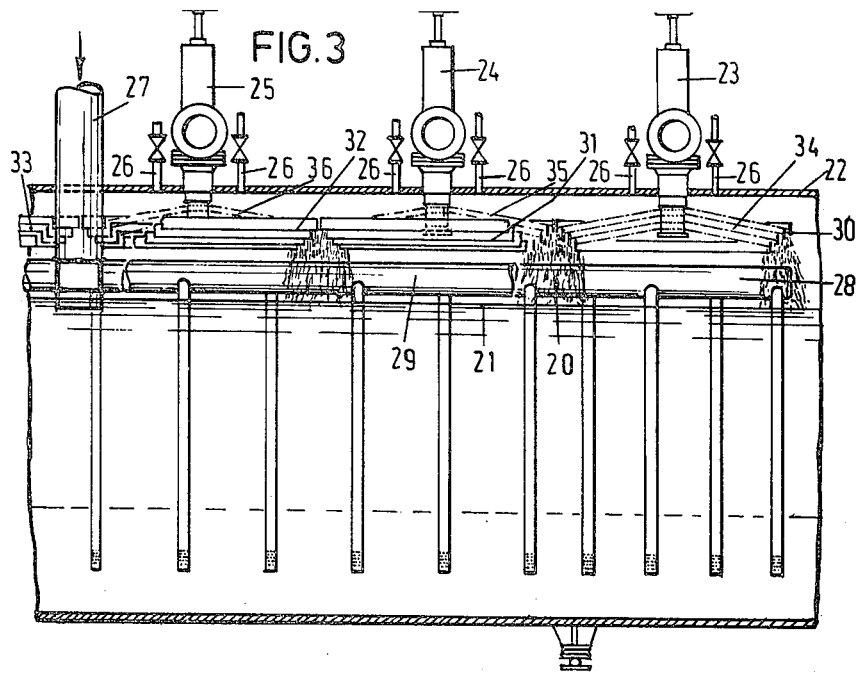
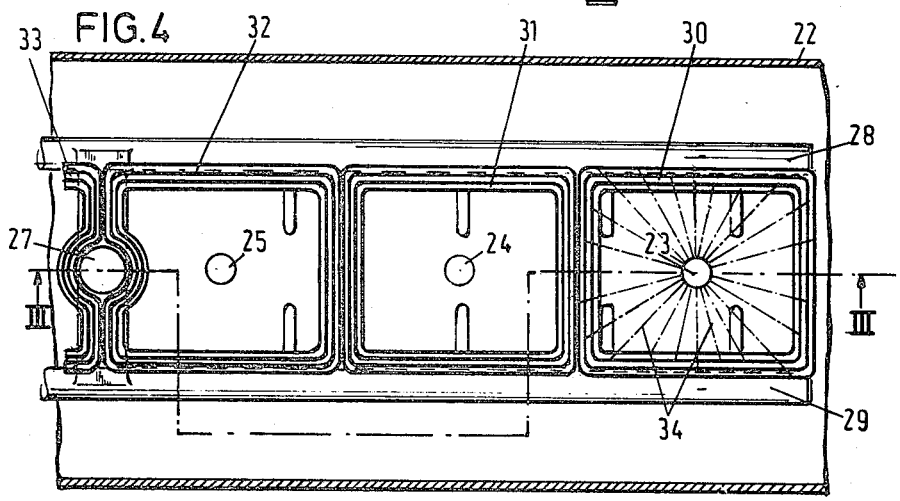
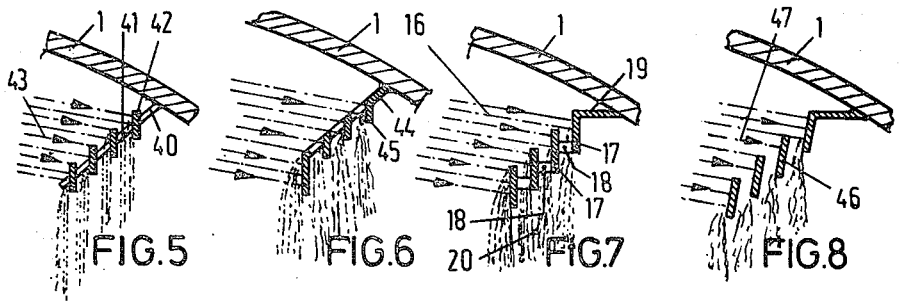

3,925,038

WATER DEGASSING DEVICE

The invention relates to a device for degassing water under excess pressure, more particularly boiler feed water, said device comprising a vessel, the top side of which has at least one nozzle provided with an inlet for the pressurized water to be degassed and being capable, in operation, of spraying the water in the form of a screen projecting above the water level in the vessel, said device having one or more steam inlets and steam distributors, an outlet for the degassed water located near the lower side of the vessel and one or more outlets for the separated gases. In such a degassing device, whose vessel usually has the shape of a long, horizontal cylinder, the water jets emerge from the nozzle with a very high speed. Whilst the speed is maintained, the jets contacting the vessel walls are led to the water level. As a result the time of sojourn of the sprayed water above the water level may sometimes be too short. Moreover, the jets touching the water level with the same speed produce an undesirable turbulence of the water surface. The invention has for its object to provide a device of the kind set forth, in which the time of sojourn of the sprayed water above the water level is increased, whilst the turbulence of the water in the vessel is reduced.

According to the invention the nozzle is surrounded for this purpose by one or more jet-deflecting surfaces extending in the path of the water screen and forming part of a splash grating formed by a plurality of strips arranged on end and over-lapping each other in a direction of height and being relatively off-set in the flow direction of the water from the nozzle, a higher strip being located behind a lower strip viewed in the direction of the outflow. Since the jets of the water screen are broken up, the flow energy is utilized for dividing the sprayed water into fine drops. The fine drops fall freely down on the water surface so that a longer time of sojourn of the water above the water level is obtained, whilst owing to the improved division into drops the heat and mass transfer is improved which is conducive to the degassing process. Since the sprayed water falls down on the water surface in the form of rain, this water surface is stirred to a lesser extent. The particular design of the splash grating provides a particular effective distribution of the water screen because, so to say, several layers are peeled off from this screen and converted separately into drops falling down like rain.

According to the invention at least the topmost strip but one may have recesses or apertures. In this embodiment the water entering the topmost strip but one across the apertures or recesses will be broken up by the topmost strip. This is important in the event of a low capacity device, in which case the water is not sprayed above the topmost strip but one due to the lower speed of the outflow. In the absence of the apertures or recesses steam could flow freely upwards along the topmost strip without contacting the water screen.

According to the invention the strips may form part of a splash grating formed by perforated sheets inclined upwardly and being at an acute angle to the flow direction of the water screen, the dams between the perforations being bent over so that they extend in a direction of height and transversely of the jets of the screen. Also in this case the breaking surfaces are in staggered positions and the screen is subdivided into fractions, each of which is converted into drops. Structurally the splash grating then constitutes a single unit and no special precautions have to be taken to join separate parts to the grating.

According to the invention the breaking surfaces may form part of one or more strips or sheets supported from the vessel walls. In this embodiment the water screen is left unchanged as long as possible, whilst the strips or sheets can be easily fastened.

According to the invention the vessel may comprise a plurality of nozzles and the splash gratings for adjacent nozzles may be in contact with each other. This design permits of using a greater number of nozzles over a minimum length of the vessel. Owing to the splash gratings the jets are prevented from the touching the water surface directly one alongside the other so that no special precautions are needed for avoiding said disadvantage.

According to the invention a supply stub with an inlet tube for steam or hot condensate may be arranged centrally between two nozzles, whilst the splash gratings extend around the tube. If such a tube were used without the splash grating, the jets of the water screen might strike this tube directly and vigorously, which would result in serious corrosion at the contact areas. Owing to the splash grating arranged in the manner described above there is no risk of the jets directly striking the hot tube. Consequently, despite the small intervals between the nozzles the desired stubs with the inlet tubings can be provided.

The invention will now be described more fully hereinafter with reference to a few embodiments shown in the drawing.

In the drawing

FIG. 3 is a sectional view of a different embodiment of the device in accordance with the invention taken on the line III—III in FIG. 4.

FIG. 4 is a horizontal sectional view of the device shown in FIG. 3,

FIG. 5, 6, 7 and 8 are sectional views of different embodiments of a splash grating taken on the line VII—VII in FIG. 2.

Figure 1:
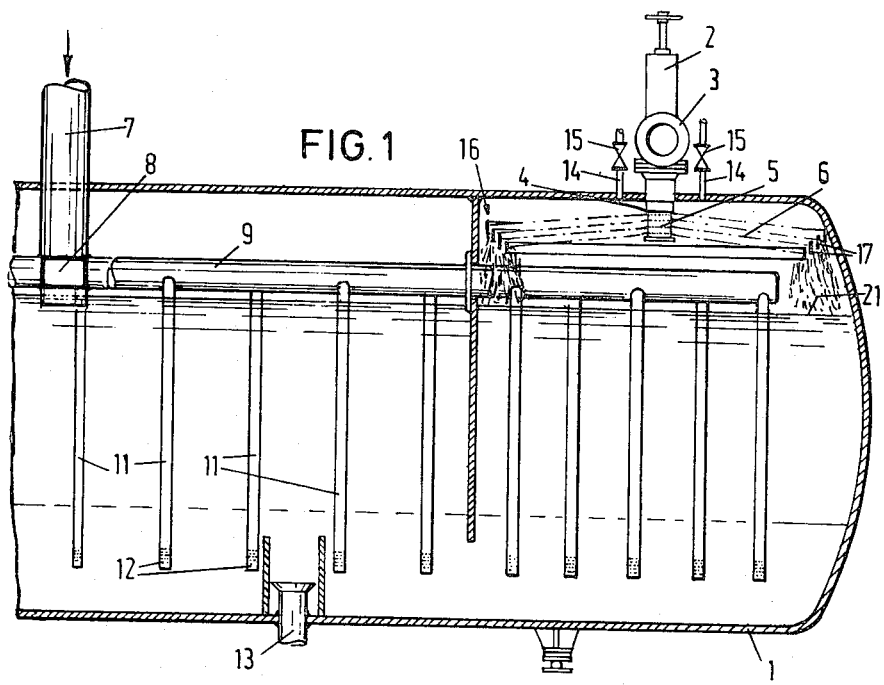
FIG. 1 is a sectional view of part of a device in accordance with the invention taken on the line I—I in FIG. 2.
Figure 2:
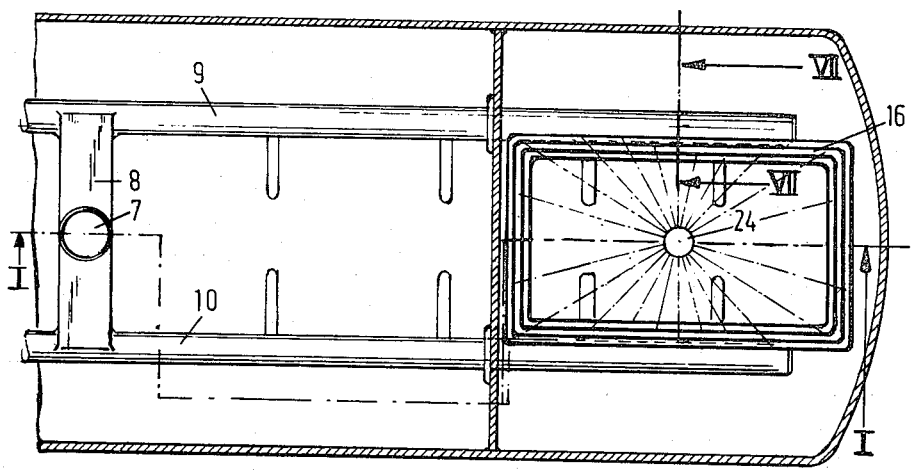
FIG. 2 is a horizontal sectional view of the device shown in FIG. 1.

The device shown in FIG. 1 comprises a vessel 1 provided with a nozzle 2 fastened in the upper part of the vessel. The nozzle 2 is provided with an inlet 3 for the pressurized supply of water to be degassed. The degassing nozzle 2 has a portion 4 extending into the vessel 1 and having spraying apertures 5 at the periphery. The pressurized water emerging from the apertures 5 is split up in the form of a conical screen 6 shown schematically.

The vessel 1 comprises furthermore a steam supply tube 7, which communicates with a transverse pipe 8, which in turn communicates with two pipes 9 and 10 extending in the direction of length and provided each with vertical pipes 11. Near the lower ends the vertical pipes 11 have outlet apertures 12. On the lower side the vessel has an outlet stub 13 for the degassed water. Near the nozzle, above the screen two outlets for the extracted gases are provided. The passage of the outlets 14 can be adjusted with the aid of a valve 15. Around the nozzles 2 a splash grating 16 extends in the vessel 1. This splash grating comprises a plurality of strips 17 arranged on end as is shown in detail in FIG. 7. The strips 17 are interconnected by transverse plates 18 arranged on end. The right-hand strip 17, viewed in FIG. 7, is connected with the wall of the vessel 1 by a strip 19 at right angles to said strip. The strips 17 overlap each other in a direction of height, whereas in the direction of flow of the water screen 6 they are relatively off-set. A higher strip 17 is located, viewed in the direction of flow, behind a lower strip 17. It will be apparent from FIGS. 7 and 1 that the water screen 6 is broken up layer by layer by the strips 17, the jets colliding with a strip 17 being divided into fine drops 20 which fall down like rain on the water surface 21 in the vessel 1. Consequently, the water screen 6 emerging at a very high rate is strongly delayed so that the time of sojourn of the water above the water surfaced 21 is considerably increased. If the splash gratings were not provided, the water screen 6 would be passed with high speed from the wall of the vessel 1 in the water surface 21. As a result the water surface would be strongly disturbed, which is not advantageous for the process. The energy of the jets of the water screen 6 used for setting the water surface 21 into motion is utilized in the presence of the splash grating 17 for splitting up the water of the screen 6 into fine drops. Moreover, this fine division is highly conducive to the transfer of heat and mass.

FIGS. 3 and 4 show an embodiment of a device in accordance with the invention which also comprises an elongated vessel 22. This vessel comprises nozzles 23, 24 and 25. Apart from the nozzles outlets 26 are provided for the escaping gases. Through a pipe 27 steam is supplied to longitudinal pipes 28 and 29. Around the nozzles 23, 24 and 25 are arranged splash gratings 30, 31 and 32. A nozzle not shown is surrounded by a splash grating 33. The nozzles 23, 24 and 25 and the nozzle not shown are arranged as closely to each other as is possible. The splash gratings 30, 31, 32 and 33 are, therefore, adjacent each other. In this way the space above the water screens 34, 35 and 36 produced is completely closed. Owing to the presence of the splash gratings 30, 31, 32 and 33 the jets of the water screens 34, 35 and 36 are prevented from intermingling in the junction zones and from directly striking the water surface.

The adjacent parts of the splash gratings 32 and 33 are passed around the pipes 27. This has the advantage that the jets of, for example, the water screen 36 do not directly come into contact with the hot pipe 27. In this way serious corrosion is avoided. The embodiment shown in FIG. 3 and 4 thus permits of using a very compact structure without the risk of structural difficulties.

FIG. 5 shows a further embodiment of a splash grating. Herein a plate 40 is used and the apertures 41 are separated by dams 42, which are formed by bent-over punched parts of the plate 40. The bent-over dams 42 constitute the surface on which the water jets of the screen 42 are broken up. The embodiment shown in FIG. 6 comprises a plate 44, from which tags 45 are punched and bent over downwardly. The embodiment shown in FIG. 7 comprises strips 17 arranged on end, as stated above. In the embodiment shown in FIG. 8 the strips 46 arranged on end are directed at right angles to the jets of the water screen 47. It is not shown in detail how the strips 46 are connected with each other. This may be done in the same manner as indicated in FIG. 7.

In the embodiments shown the strips arranged on end constitute rectangular splash gratings. The splash gratings may, as an alternative, be circular, the nozzle being then located at the centre of the circle. In the latter case the jets emerging from the nozzle are substantially at right angles to the strips of a splash grating.

What we claim is:

1. A device for degassing water such as boiler feed water, comprising in combination:

a closed vessel having steam supply means for supplying pressurized steam and including a steam inlet conduit extending into said vessel and a steam distribution manifold presenting steam discharge openings adjacent the bottom of the vessel to discharge steam well below the surface of a body of water contained in the vessel whereby the body of water remains in relatively quiescent state, said vessel having vent means in the top region thereof for venting gasses while maintaining the interior of said vessel under superatmospheric pressure, said vessel having a water discharge conduit for maintaining said surface of the body of water within the upper region of said vessel;

supply means for delivering water under pressure into said vessel and including a spray nozzle located above said surface and delivering at least one high velocity jet spray curtain in generally horizontal fashion above said surface; and grating means for intercepting said high velocity spray curtain and directing it in an undisturbed, gravity fall rainfall-like fashion onto said surface whereby minimally to disturb said relatively quiescent state of the body of water, said grating means comprising a plurality of generally vertical surfaces disposed in horizontally spaced and in ascending overlapping relation in the direction of said jet spray curtain.

2. A device for degassing water as defined in claim 1 wherein said nozzle delivers a shallow conical pattern of jet spray curtains and said surfaces surround said nozzle to define an open central region within which said curtains issue.

3. A device as claimed in claim 2 including a plurality of nozzles and corresponding splash gratings, the splash gratings of adjacent nozzles being in contact with each other.

4. A device as claimed in claim 3, characterised in that centrally between two nozzles a supply stub having a steam or hot condensate pipe is provided and in that the splash gratings extend around said pipe.

5. A device for degassing water as defined in claim 1 wherein said surfaces are defined by strips facing said nozzle.

6. A device as claimed in claim 5, characterised in that at least the topmost strip but one has recesses or apertures.

7. A device as claimed in claim 1, characterised in that said surfaces form part of a splash grating formed by perforated plates inclined upwardly and being at an acute angle to the direction of outflow of the water, the dams between the perforations being formed by punched, bent-over portions so that they extend in a direction of height and transversely of the jets of the screen.

* * * * *